United States Patent [19]

Sullivan

[11] Patent Number: 5,592,346
[45] Date of Patent: Jan. 7, 1997

[54] CONTROL SYSTEM UTILIZING AN ADAPTIVE PREDICTOR TO COMPENSATE FOR HARMONIC DISTORTION

[75] Inventor: Paul F. Sullivan, Westwood, Mass.

[73] Assignee: Polaroid Corporation, Cambridge, Mass.

[21] Appl. No.: 221,189

[22] Filed: Mar. 31, 1994

[51] Int. Cl.$^6$ ............................ G11B 5/596; G01R 23/165
[52] U.S. Cl. ...................... 360/77.04; 324/76.31
[58] Field of Search .................. 360/77.04, 78.04, 360/77.02, 77.03, 77.07, 77.08, 78.07, 10.3, 10.5; 318/616; 356/346; 369/32, 44.25, 44.32; 395/2.42; 375/80; 324/212, 76.31, 77.11

[56] References Cited

U.S. PATENT DOCUMENTS

| | | | |
|---|---|---|---|
| 4,135,217 | 1/1979 | Jacques et al. | 360/77.04 |
| 4,237,502 | 12/1980 | Erickson, Jr. et al. | 360/78.07 |
| 4,396,959 | 8/1983 | Harrison et al. | 360/77.08 |
| 4,480,914 | 11/1984 | Thompson et al. | 356/346 |
| 4,485,414 | 11/1984 | Baker | 360/10.3 |
| 4,488,189 | 12/1984 | Axmear et al. | 360/78.04 |
| 4,516,177 | 5/1985 | Moon et al. | 360/77.07 |
| 4,536,809 | 8/1985 | Sidman | 360/77.04 |
| 4,568,988 | 2/1986 | McGinlay et al. | 360/77.02 |
| 4,616,276 | 10/1986 | Workman | 360/77.04 |
| 4,634,946 | 1/1987 | Moulds III et al. | 318/561 |
| 4,691,152 | 9/1987 | Ell et al. | 318/616 |
| 4,860,271 | 8/1989 | Yokogawa | 369/44.13 |
| 4,912,387 | 3/1990 | Moulds III | 318/629 |
| 4,950,966 | 8/1990 | Moulds III | 318/561 |
| 4,954,905 | 9/1990 | Wakabashi et al. | 360/77.03 |
| 4,994,991 | 2/1991 | Richman | 364/581 |
| 5,049,795 | 9/1991 | Moulds III | 318/561 |
| 5,109,366 | 4/1992 | Moriya et al. | 369/32 |
| 5,121,374 | 6/1992 | Barton et al. | 369/44.29 |
| 5,164,647 | 11/1992 | Moulds III | 318/561 |
| 5,379,171 | 1/1995 | Morehouse et al. | 360/10.5 |

FOREIGN PATENT DOCUMENTS

| | | |
|---|---|---|
| 0094313 | 11/1983 | European Pat. Off. . |
| 0322841 | 7/1989 | European Pat. Off. . |
| 0392777 | 10/1990 | European Pat. Off. . |
| 2187878 | 9/1987 | United Kingdom . |
| 9306595 | 4/1993 | WIPO . |

Primary Examiner—Aristotelis Psitos
Assistant Examiner—Patrick Wamsley
Attorney, Agent, or Firm—Christopher P. Ricci

[57] ABSTRACT

An adaptive predictor for use with a control system to predict error contributions due to harmonic distortion in a error signal such that the prediction signal may be fed back and added to the error signal to compensate for the harmonic distortion. The adaptive predictor takes the error signal representative of misposition error and performs a discrete Fourier analysis to determine contributions due to individual harmonics. It then adjusts the results and tallies a running total thereby adapting to a mechanical system in which it is contained. The running total is combined with a carrier signal which is clocked to produce a predictive signal representing harmonic distortion at a given time. The predictive signal is then added back with the original error signal to produce a harmonic distortion compensated signal.

17 Claims, 5 Drawing Sheets

CONTROL SYSTEM UTILIZING AN ADAPTIVE PREDICTOR TO COMPENSATE FOR HARMONIC DISTORTION

BACKGROUND OF THE INVENTION

This invention relates generally to mechanical systems having control systems. More particularly, the invention concerns control systems that adaptively compensate for harmonic distortion in mechanical systems that operate on a periodic basis.

Many mechanical systems experience position errors due to harmonic distortion. The harmonic distortion induces one or more components of the mechanical system to stray from its proper position thereby creating an amount of error. Control systems are utilized to compensate for the error by determining the error amount and indicating to a servomechanism to reposition by an amount equal to the error toward the proper position thereby tracking the proper position.

For many mechanical systems, the ability to track the proper location is vital to the system's operation. In such systems, harmonic distortion severely decreases the system's ability to function and, where error signals are involved, decreases the signal-to-noise ratio. For example, a magnetic recording disk used in a computer contains multiple concentric tracks used for data storage. A control system is used by the computer's disk drive to ensure that a data transducer reads/writes in the proper location, i.e. the center of a selected track on the disk. The disk is adapted to be rotated about an axis centered in disk's central spindle hole. If this hole was punched through the disk even slightly removed from the center axis of rotation, then the disk rotation will become eccentric causing the data transducer to vary from the center of a selected track creating a position error. The error will be a maximum amount once per rotation thus creating a once around error, or first harmonic, which will have to be tracked by the control system. Another example, a data recording medium having a base fabricated from an anisotropic material, such as MYLAR®, is susceptible to changes in heat or humidity. Such changes would cause the disk to become elliptical creating a twice around error, or a second harmonic, which would have to be tracked by the control system. Further, if the disk was turned by an eight-pole motor then there may exist distortions in the eighth harmonic which would have to be tracked by the control system, in this case controlling the speed of rotation.

Another example of a mechanical system detrimentally affected by harmonic distortion is a drum printer. A focused light source in the drum printer projects light onto a receptive recording medium as the medium rotates within or on a drum, thus creating an image on the medium. If the drum is distorted in any way, the light source will have to refocus as the distance to the medium increases and decreases during the course of a revolution of the drum to avoid blurring or distorting the image. Distortions may occur in the drum if, for example, the drum was turned on a lathe utilizing a three-jaw chuck. The drum may then have distortions in a third harmonic. Or, a one-half harmonic may be created due to oil whip in a bearing as the drum rotates.

Figure 1:
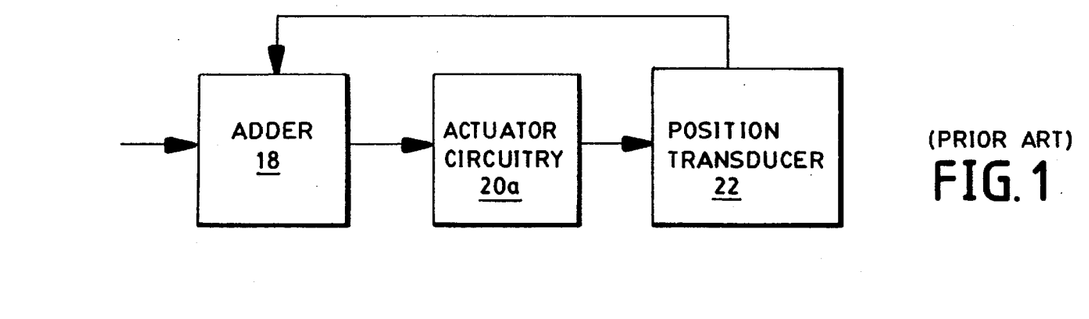
FIG. 1 shows a block diagram of a conventional prior art control system.

Conventional control theory teaches the use of a negative feedback loop to compensate for errors in a tracking system used, for example, in a disk drive. An example of such a loop is illustrated in FIG. 1. In such systems, a signal representing a measurement of error, as determined by the difference between current location and target or proper location, is transmitted back and its negated value is added into the tracking system to cause movement of the actuator by the amount of the error toward the target location. While responsive to the errors, this loop requires that the errors first occur before even attempting to correct them. This means that data from wrong tracks may be promulgated before any correction is attempted.

Another problem commonly found in current control systems is termed control system lag. Control system lag is the time delay between the time the tracking system detects an error and the time required for the control system to adjust to the proper location. Some of this delay is due to the electrical response of the control system, such as, for example, that resulting from a low sampling rate; the remaining delay is due to the mechanical response characteristics of the electromechanical actuator. These delays characterize the "bandwidth" of the control system. The greater the bandwidth the faster the positioning system can respond to an error condition thereby providing tightly controlled positioning. A positioning system having a high bandwidth is capable of providing increased data track density because tracks can be followed within a smaller tolerance.

Prior art teaches adding a memory loop to the aforementioned negative feedback loop so that the system can average data samples along a radial vector of a disk, for example, and predict that another point attained along the same radius will have the same error scaled accordingly. A problem with this method is that the memory loop needs to store a large number of samples per revolution and average them over many revolutions in order to achieve an acceptable noise suppression. Though this loop represents an improvement over the previously described loop, this loop at any given time examines only the samples along the same radius of the disk without any regard to the many other radii also contained in memory thereby creating a relatively low signal-to-noise ratio.

The previously described negative feedback loops are also susceptible to communicating incorrect error measurements when distortions become too great. This may occur when the central hole in the disk is severely decentered or the disk has distorted and become substantially elliptical, for example. The tracking system may cross a track and then use the incorrect track as the target, or proper, location and will calculate error with respect to the incorrect track instead of transmitting the substantial error that has actually occurred.

A prior art system, described in U.S. Pat. No. 4,536,809, entitled "Adaptive Misposition Correcting Method and Apparatus for Magnetic Disk Servo System" by Michael Sidman issued Aug. 20, 1985, employs a servo control system that periodically and iteratively determines position error. The harmonic contributions of the position error are passed through a filter having an impulse response that matches the characteristic waveform, a sinusoid.

A problem with the aforementioned approach is that the correction scheme adds the prior error with the current error before analysis. The effect is that error due to hardware is compensated for but the control system's ability to compensate for imprecision in the filter, representing the data model, is severely limited. This means that the filter applying the data model has to be near flawless and allows little margin for inaccuracy. Another problem is the storage of attained data as a vector. Using the vector requires that the entire vector must be constantly reprocessed through the filter using additional processing time. A third problem with the system is the fact that when it looks at the position error it is not able to look at read/write data and vice versa. And, since it only looks at the position error periodically, the runout may become substantial between reviews. Further, iterations to refine the harmonic contributions are expensive to the system in terms of data access speed for the same reasons. The system is also not readily adaptable to other control schemes due to the precision required in designing filters with accurate impulse responses.

Therefore, it is an object of the invention to decrease errors in control systems due to harmonic distortion thereby increasing data reliability.

It is another object of the invention to provide a control system predictive loop that is adaptive to changing conditions as well as easily adaptable to various control system designs.

It is yet another object of the invention to increase tracking reliability of a control system independent of the magnitude of the distortion.

These and other objects of the invention will be obvious and will appear hereinafter.

SUMMARY OF THE INVENTION

The aforementioned and other objects are achieved by the invention which provides, in one aspect, a method and apparatus for compensating for harmonic distortion within an error signal which is representative of error in a mechanical system that operates on a periodic basis. The invention provides an extremely versatile adaptive compensation scheme for control systems to be used by itself within the mechanical system or with existing control systems. The invention comprises an analysis means, an adaptive means and a synthesizing means combined in an adaptive predictor apparatus and method for compensating for harmonic distortion in a control system.

The analysis means receives the error signal and computes the harmonic distortion within the error signal by utilizing discrete Fourier analysis. The Fourier analysis produces a series of coefficients of trigonometric functions which describe the harmonic distortion. The coefficients for each harmonic are then encoded within a coefficients signal which is transmitted to the adaptive means.

The adaptive means controls a response to harmonic distortions by adjusting the coefficients signal using a variable gain control for selectively controlling adjustments of the coefficients signal. The gain control may also be operated independently for each harmonic being examined to provide additional control over the rate of adaptation to the mechanical system.

The adaptive means then combines the coefficients signal with an extended coefficients signal of substantially all previous periods of operation of the mechanical system. By combining the coefficients signals the adaptive means moves toward a precise definition of the harmonic distortion adaptable to variations in the operation of the mechanical system. The adaptive means then creates an adaptive error signal, or a revised extended coefficients signal, containing this definition of harmonic distortion.

The synthesis means receives the adaptive error signal and combines a carrier signal with the adaptive error signal to produce a predictor signal representative of harmonic distortion in the error signal. The carrier signal is clocked such that the output of the synthesis means is reflective of a prediction of the harmonic distortion at the current time. The predictive signal is then added to the error signal to compensate for the harmonic distortion.

The adaptive predictor is advantageously used within a conventional control system, inter alia, utilizing negative feedback. In such a system, a feedback signal is used to represent a difference between a current position in the mechanical system and a proper position. This feedback signal is fed into a first adder means where the feedback signal is negated and added to a command signal to produce a first error compensated signal. This first error compensated signal is passed to the adaptive predictor and also fed into a second adder means. The second adder means adjusts the first error compensated signal by an amount dictated by the predictive signal to produce an output signal error compensated for harmonic distortion.

The output signal is then transmitted to actuator means which responds to the output signal by adjusting the current location in the mechanical system and again producing the feedback signal representative of the difference between current location and proper location.

By using discrete analysis, the system may also monitor data reliability. This is accomplished by utilizing a sampling means to read a predetermined amount of data points from the mechanical system and generating a sample signal upon completion. At the same time, the mechanical system uses an indexing means to determine when a period of the mechanical system is complete. Upon completion an index signal is generated.

A threshold means receives the sample signal and the index signal and determines whether the sample signal occurred with an allowable threshold around said index signal. If not, the data are deemed unusable and a reporting means indicates that the allowable threshold has been exceeded.

The threshold means is also adaptive to adjust the allowable threshold based upon a difference between the sample signal and the index signal. In this way the threshold may be large during system start-up while waiting for the mechanical system to reach a steady-state and once steady-state has been achieved the threshold may be reduced for stricter analysis of transients.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

The invention is directed to a method and apparatus for compensating for harmonic distortion within a control system forming part of a mechanical system that operates on a periodic basis. In mechanical systems having a period, harmonic errors arise that repeat themselves consistently over each cycle of operation of the mechanical system. The invention examines data gathered over a period of the mechanical system and determines the harmonic errors within the system. The invention also predicts in subsequent periods that the harmonic errors will again arise at substantially similar locations during the period. Thus, the control system can compensate for the harmonic errors quickly and accurately.

The present invention provides an adaptive predictor arrangement which is versatile as to control systems and operative within a wide range of control systems regardless of the general control scheme. The adaptive nature of the invention allows the invention to be used in various systems without substantial alteration. The adaptive qualities also allow the system to adjust determinations of harmonic error as the mechanical system changes, for example, due to changing environmental conditions.

Multiple embodiments will be depicted to illustrate various control system designs utilizing the invention. In each of the illustrations, like parts will be shown with like numbers for consistency.

Figure 2:
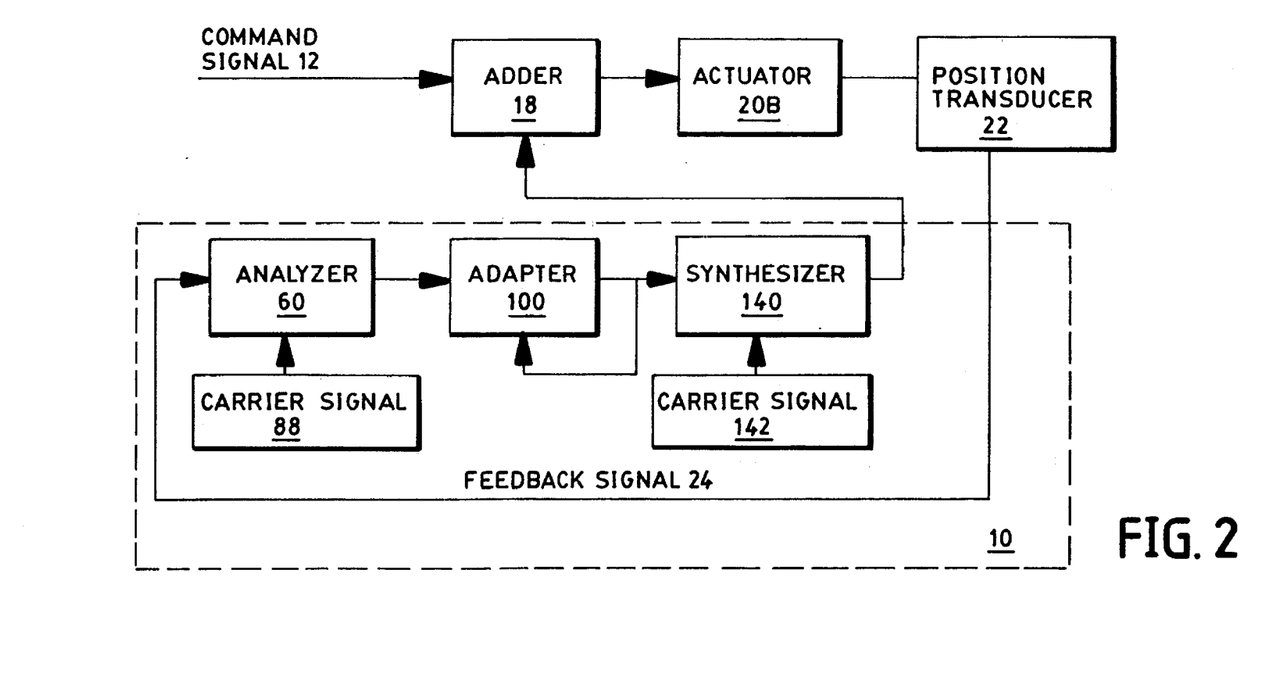
FIG. 2 shows a block diagram of a control system employing an adaptive predictor in accordance with the invention.

In FIG. 2, a simple control system is shown integrating an adaptive predictor 10 embodying the present invention into a feedback loop. In this system, a command signal 12 is used to cause an actuator 20b, which includes associated actuator circuitry, to respond. For example, such a response may be to move a read head on an optical disk drive.

Unlike the actuator 20a as shown in FIG. 1, the actuator 20b does not require compensating circuitry to compensate for a phase shift and, therefore, the actuator circuitry of actuator 20b is simplified in that respect.

A position transducer 22 then determines the position of the read head relative to its target or proper location, i.e. the center of the track to be read. The distance from the proper location is translated into an electrical signal, called the feedback signal, which is transmitted back through the feedback loop. In the present invention, the adaptive predictor 10 receives the feedback signal and passes it through an analyzer 60, an adapter 100, and a synthesizer 140 to determine the harmonic components of the feedback signal and to predict error contributions due to the harmonic components.

The analyzer 60 performs an analysis on the feedback signal to determine the harmonic components. The analysis in the preferred embodiment a discrete Fourier analysis which samples the error signal over an entire period of the mechanical system and multiplies the sampled data with an appropriate carrier signal 88 in order to determine the harmonic components.

Once the samples are gathered and the harmonic components determined, the adapter 100 then adjusts the harmonic components and calculates a running total contribution due to each individual harmonic. The running total contribution allows the control system to dynamically adapt to changes within the systems by making adjustments to changes in the harmonic contributions. In addition, the running total contribution allows the systems to asymptotically approach an exact assessment of harmonic contributions by making minute adjustments over multiple periods of operation of the mechanical system.

The running total contribution is then multiplied by a carrier signal 142 within the synthesizer 140 such that the harmonic components can be combined with the command signal 12 by the adder 18. The carrier signal 142 is time dependent and is clocked so as to multiply the harmonic contribution by a representative function, i.e. a sinusoid, thus predicting the harmonic error in the control system at any given time. The adaptive predictor passes this prediction back to the control system allowing the mechanical system to quickly attain its proper location.

Figure 3:
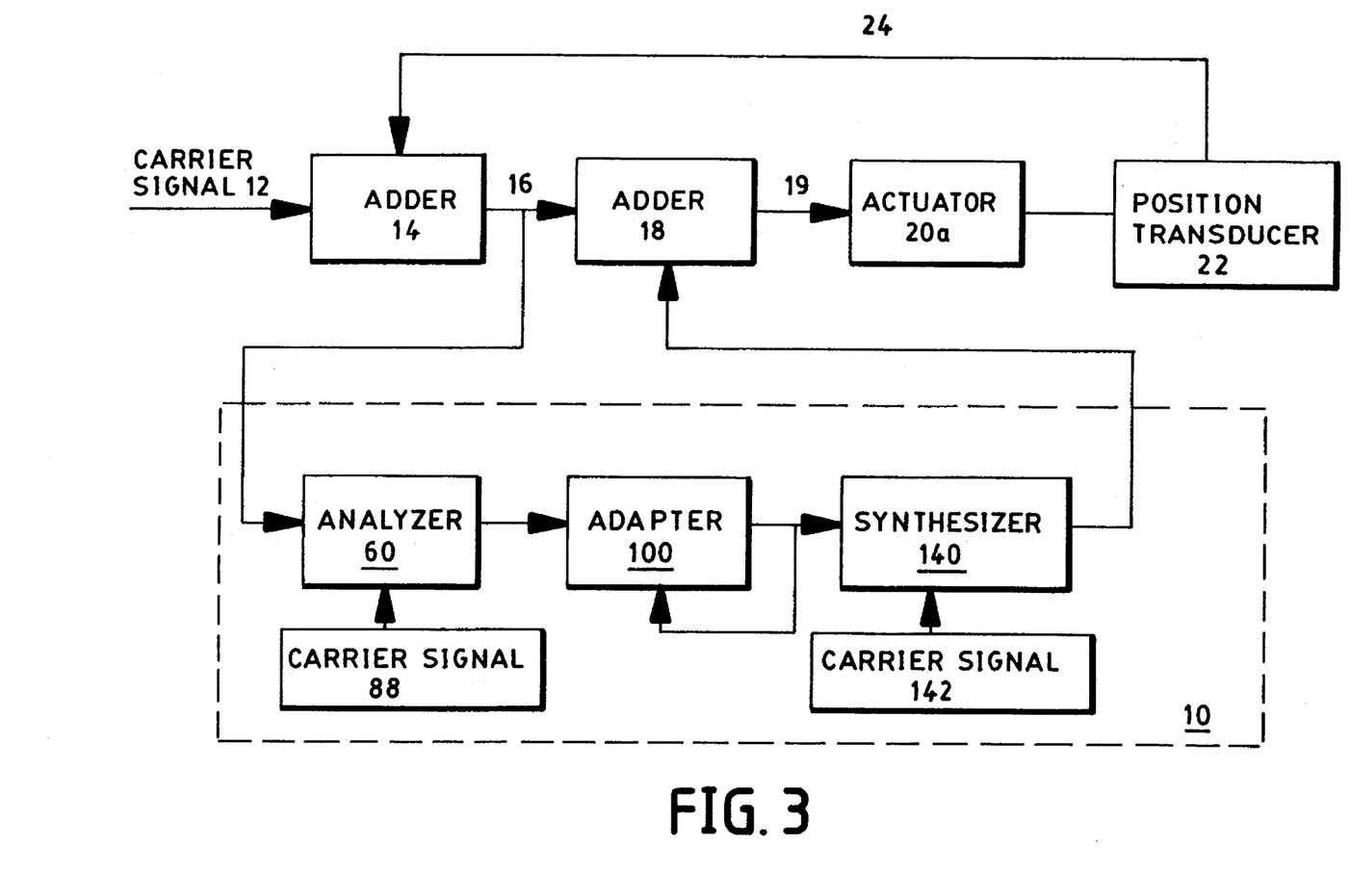
FIG. 3 shows a conventional control system utilizing the adaptive predictor of FIG. 2.

FIG. 3 illustrates a second preferred embodiment of the invention in which the adaptive predictor is utilized in conjunction with the conventional negative feedback system previously described and illustrated in FIG. 1. In this system, the adaptive predictor takes as its input an error signal 16 which is a negated version of the feedback signal from the negative feedback loop 24 combined with the command signal 12. The error signal 16 is processed, by adaptive predictor 10, as described above, to produce the predictor signal predictive of harmonic distortion in the system. The predictor signal is then fed into an adder 18 which combines the predictor signal with the error signal 16 producing an error compensated signal 19. The error compensated signal 19 drives the actuator 20a which repositions the transducer 22 to correct for the position error. In the example of the disk drive read/write head, the head would be moved toward the center of the track and the residual position error, if any, passing back through the feedback loop as a position error signal would be decreased reflecting only additional runout that has occurred since the previous position adjustment.

Figure 4:
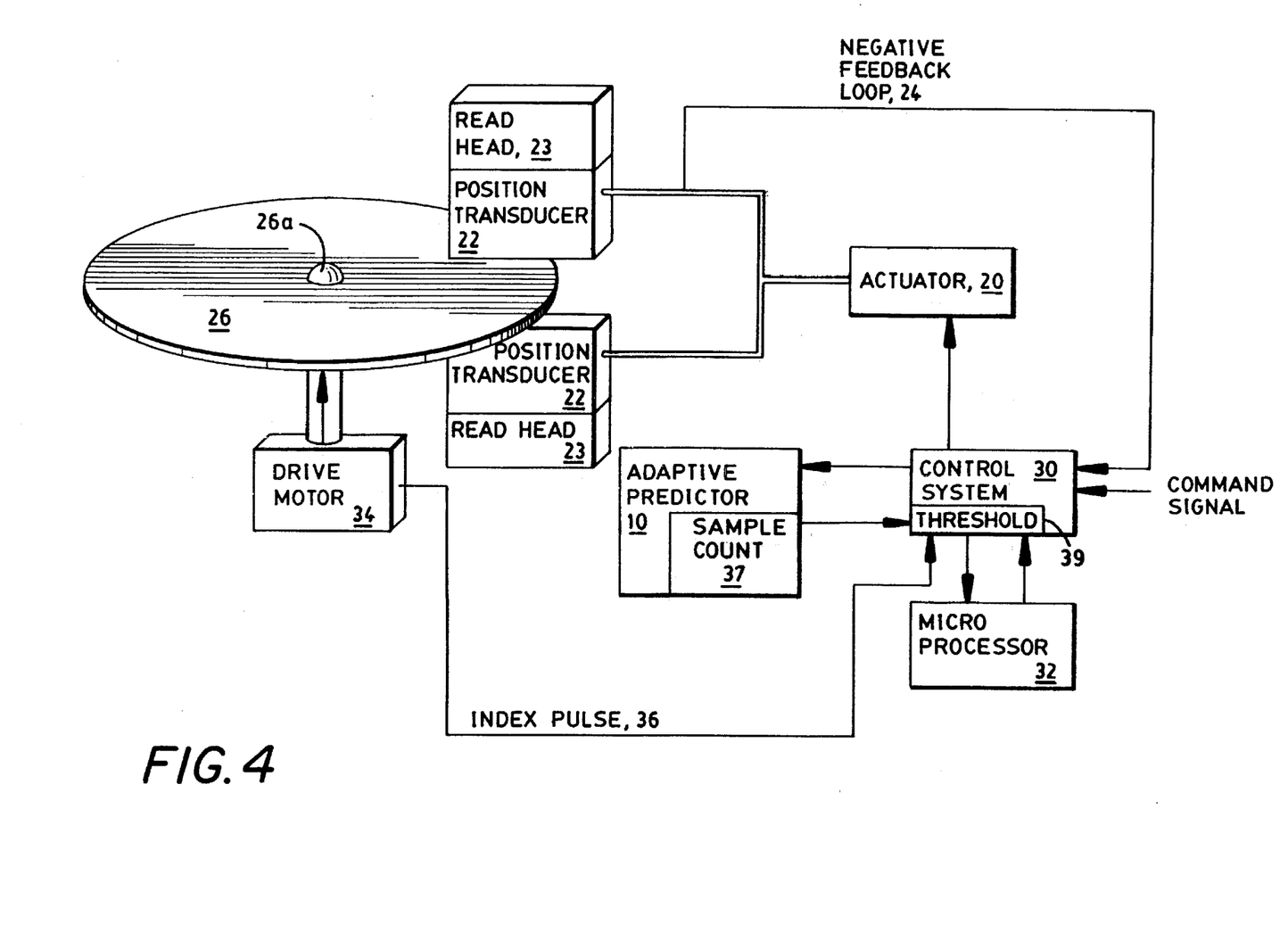
FIG. 4 shows a disk drive utilizing the adaptive predictor of FIG. 2.

FIG. 4 illustrates an exemplary embodiment of the invention where the adaptive predictor is used with an optical disk drive. While the present invention retains utility within a wide variety of mechanical devices, and may be embodied in several different forms, it is advantageously employed in connection with magnetic or optical mass storage devices for computer systems. Though this is the form of the illustrated embodiment and will be described as such, this embodiment should be considered illustrative and not restrictive.

Figure 5A:
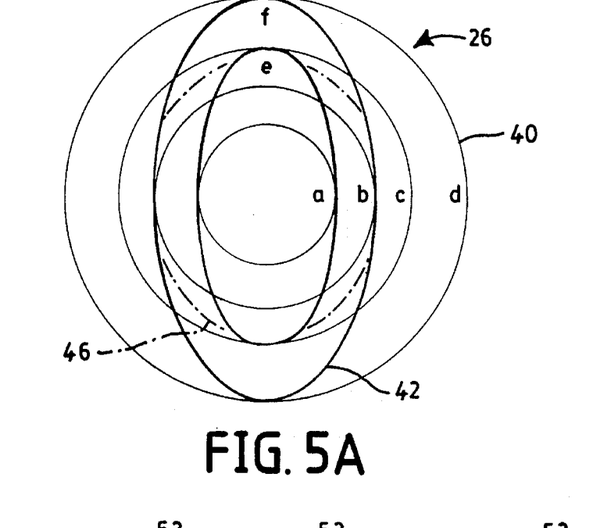
FIGS. 5(A), 5(B), and 5(C) respectively illustrate an example of an elliptical disk, the resulting tracking noise and a frequency domain plot of harmonic energies.

In FIG. 4 with reference to the disk depicted in FIG. 5A, an optical disk 26 is being rotated about its center axis 26a by a drive motor 34. As the optical disk is rotated, a control system 30 is employed to position a read head 23 over a track 40 on the optical disk. As the read head 23 traverses the center of a selected track 40, a position transducer determines the distance from the center of the track and translates that distance into a feedback signal. The feedback signal is then sent back to the control system via a negative feedback loop 24 where it is evaluated by the adaptive predictor 10. The control system 30 may utilize the adaptive predictor 10 in either of the two previously illustrated forms and is, therefore, simply illustrated with bi-directional data transfer without limitation.

In practice, the read head 23 gathers data from a track 40a as the optical disk 26 rotates. If the read head 23 strays outwardly from the center of the track 40a, it begins to overlap an adjacent track. Therefore, if the read head 23 strays from the center of a track by fifty percent of the track width then the read head will be reading fifty percent of a next adjacent track (assuming that the head reads the entire track width).

To avoid this scenario, a control system utilizing negative feedback is incorporated into the system so that as the read head 23 strays off the center of the track due to unanticipated movement of the read head 23 and/or physical distortion of the tracks on the disk, among others, the control system 30 can make adjustments to the position of the read head 23 to keep it centered on a selected or target track. The control system 30 accomplishes this by using a position transducer 22 which reads its position relative to the center of the track and by transmitting the information back into the actuator 20. The position of read head 23 is known based upon transducer 22 reading reflected light incident on indicia on the disk such as wobble pits, an example of which is described in commonly assigned U.S. Pat. No. 5,452,285, issued Sep. 19, 1995 entitled "Digital Servo for Optical Information Storage Media" by Marinus J. B. M. Monen.

The position transducer 22 then encodes its position relative to the center of the target track into an error signal which is sent along the negative feedback loop 24. In the example of the optical disk, a half micron displacement from the center of the track would translate into one millivolt feedback signal along the negative feedback loop 24.

This feedback signal is then negated and added to the command signal 12 at adder 14 as shown in FIG. 3. It is negated to cause the actuator 20 system to move in a reverse direction by the magnitude of the error.

The command signal 12 is generally equal to zero when the head actuator is in a track read mode as opposed to a track seeking or selection mode which indicates that the read head is simply going to follow the tracks 40. If a command signal is present, it is for the purpose of causing an abrupt intentional cross track movement of the read head 23; for example, to randomly access specific data on a selected track. Abrupt intentional movements in the track seeking mode, such as seek commands, are not errors and, therefore, when present the data collected by the invention will be disregarded and not used by the adaptive predictor. In the track following mode, the command signal 12 will always be assumed to be zero.

When the command signal 12 is zero, the feedback signal is simply propagated in its negative form through adder 14 resulting in the error signal line 16. The adaptive predictor 10 then samples the signal 16 and continues to sample each new error signal through one complete revolution of the disk. The number of samples is high relative to the frequency of the position error to ensure a reliable representation of the position error occurring during one revolution of the disk. In the preferred embodiment, 1024 discrete samples are taken through each revolution of the disk 26. Continuous-time analysis may also be used if higher speed calculations are required but discrete-time analysis is preferred because it is less difficult to synchronize with the periodic movement of the mechanical system.

The analyzer 60 then dissects the sequence of signals into its harmonic components by representing the sequence of signals by means of linear operations such as summation, or integration if continuous-time analysis, on characteristic sets of functions. In the preferred embodiment, this is accomplished using a Fourier series which is series of sine and cosine functions capable of approximating a wide variety of mathematical functions. The aforementioned series is limited by the number of samples in that harmonics up to the number of samples divided by two may be ascertained. In the preferred embodiment, 1024 samples are gathered so the maximum harmonic that may be calculated is the $512^{th}$.

Once analysis of a complete revolution of the disk 26 is finished, the coefficients of the trigonometric functions defining the harmonics are then passed from analyzer 60 to the adapter 100 where they are adjusted based upon global system information such as long seeks, external vibration, and other factors, and then summed with a running total of previous coefficients representative of the individual harmonics. By doing so, the adapter 100 produces an adapted coefficients signal that is predictive of the error contribution of the individual harmonics. The adapted coefficients signal is a vector of coefficients having two elements for each individual harmonic.

In the first part of this example where the tracks 40 are initially ideally circular and disregarding other factors, the adapted coefficients would be approximately zero for the second harmonic indicating no harmonic contribution due to ellipticity. Over time, slight changes in ellipticity would be reflected in the magnitude of the harmonic as indicated by the coefficients signal.

This adapted coefficients signal is then passed on to the synthesizer 140 where the harmonic components are evaluated. Each adapted coefficient in the adapted coefficients signal is multiplied by the trigonometric function representing its harmonic evaluated at the current sample position. This information produces a predictive signal which is a sinusoid predictive of harmonic distortion at the sample position.

The sinusoid is then added back to the sequence of signals on error signal line 16 via adder 18 to produce a harmonic error compensated signal. The harmonic error compensated signal drives the actuator 20 causing the read head 23 to be repositioned to a spot adjusted for both transient errors as seen by the conventional negative feedback loop 24 and harmonic distortion as discerned by the adaptive predictor 10.

In this embodiment, the illustrated control system 30 also has input into the adaptive predictor 10 with regard to the usability of the data that has been gathered. As the optical disk 26 rotates the adaptive predictor 10 is gathering data samples representing the runout of the read head 23 which have been transmitted through the negative feedback loop 24. Since the adaptive predictor 10 strives to attain a group of samples representative of the entire optical disk 26 rotated through one complete revolution, the adaptive predictor 10 transmits back to the control system 30 a sample count 37 count of how many samples have been attained at any given time. The control system 30 then compares this sample count 37 count with an index signal or pulse 36 which is transmitted from the drive motor 34 indicating the completion of a revolution. If the adaptive predictor 10 attains a predetermined number outside of a threshold 39 around the index signal 36, i.e., of samples substantially before the index signal 36 is received or substantially after the index signal is received, then the adaptive predictor 10 will determine that the samples are unusable and will not promulgate an error correction signal due to these samples. While the preferred embodiment utilizes time based sampling, this approach to determining data usability is also amendable to angular sampling where a sample is taken every predetermined number of degrees and an index signal is transmitted at the completion of three hundred sixty degrees.

A microprocessor 32 may also be employed in conjunction with this system to monitor the control system 30 and make decisions based upon information gathered by the control system 30. For example, drive motors do not come up to their running speed instantaneously, but instead ramp up quickly and then damp contemporaneous oscillations to achieve a substantially steady state. During this initiation phase, the control system 30 acts to ignore data samples as unusable, as previously described, but after the steady state has been reached a seemingly small variation can act to make data unusable. For example, a physical bump against a table upon which the optical drive is resting may cause a variation that the control system 30 deems acceptable in comparison to initiation variations. To manage such a situation, the microprocessor 32 determines the difference between attaining the full complement of samples and receipt of the index signal and calculates a norm for the previous revolutions. This norm is then used to generate a new threshold 39 which will be downloaded to the control system causing the control system 30 to ignore the resulting data set. In this way, the microprocessor 32 acts to adaptively alter the threshold 39 to achieve greater data usability.

Figure 5B:
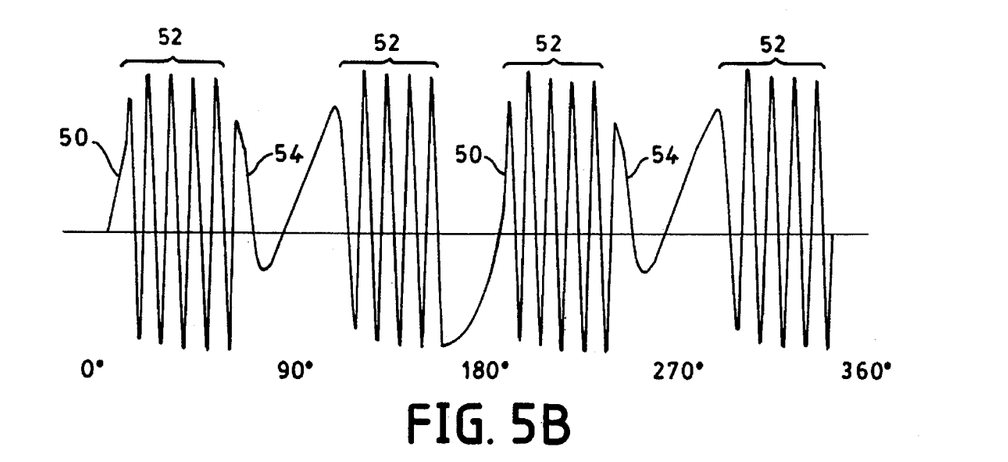
Figure 5C:
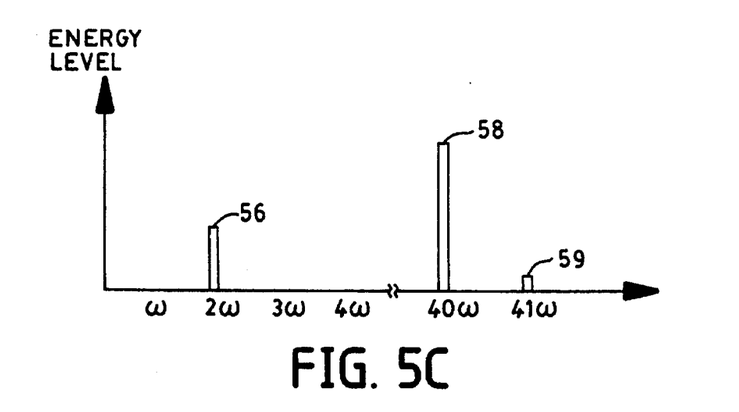

FIGS. 5A, 5B, and 5C provide further insight into how the adaptive predictor 10 works when viewed along either of the previously described embodiments, though the control system embodiment of FIG. 3 as applied to the physical embodiment of FIG. 4 will be used for illustrative purposes.

FIG. 5A shows as an example an optical disk 26 having tracks 40 arranged in concentric circles which are indicated individually as (a) through (d). In between each of the tracks 40 are five additional tracks which have not been drawn in order to simplify the drawing. It should be noted that this example utilizing optical media with concentric tracks can be substituted with magnetic media having spiraling tracks, inter alia, without affecting the adaptive or predictive abilities of the invention.

The object of the control system 30 in this example is to track the concentric circles and, therefore, a command signal 12 will be assumed to be non-present at all times. Given the perfectly circular nature of the tracks 40, the tracking system would not detect much error contribution due to a second harmonic, i.e. ellipticity. Ignoring other harmonics, the error signal would then contain only transients due to bumps, electrical noise, and other factors, which are handled through the feedback loop 24. The predictor signal for the second harmonic would be negligible.

FIG. 5A also indicates the same tracks 40 after becoming elliptical tracks 42 (indicated in thicker black outlines) and a read head trajectory 46 (indicated by a dot-dash outline). For reference, the two elliptical tracks 42 indicated individually as (e) and (f) represent an elliptical version of tracks (b) and (c), respectively.

The degree of ellipticity as shown is by no means outrageous considering the industry's use of popular anisotropic materials such as MYLAR, a trademark owned by E. I. DuPont De Nemours Co., Inc., which are extremely susceptible to environmental changes in heat and humidity. Note also that this example illustrates an elliptical disk producing a twice around error, or a second harmonic, but may very simply be adapted to illustrate eccentricity producing a first harmonic or various other sources of harmonic disturbances.

Beginning at the top, or highest point vertically, of the inner elliptical track (e), the position transducer would attempt to read indicia on the optical media to attain its current position on track (e). Such indicia include wobble pits which are spaced apart from each other in a sample servo system and the position is attained by periodically reading the distance from each wobble pit. But, since there is a spacing between wobble pits where the position transducer has no indicia to read, the position transducer 22 is essentially traveling blindly while between wobble pits. If a track is badly distorted, the read head may cross track boundaries and land in a next adjacent track before running into the next set of wobble pits. This occurs if the rate of change of the read head position relative to the tracks on the disk exceeds the frequency of the wobble pits.

FIG. 5B graphically illustrates an error signal that would be transmitted via the negative feedback loop 24 as the read head crosses tracks. Since there are five tracks (not shown) between (e) and (f) as previously described, there are five cycles 52 in the error signal before the relative velocity of the read head reduces to the point that the read head locks in on a track (f). The position transducer, having no knowledge of which track it is on, then sends error signals 54 back to the control system 30 relative to track (f). The control system 30 makes adjustment based upon this information to keep the read head 23 centered on track (f) thereby transmitting incorrect data.

Shortly thereafter, the ellipticity causes a similar process as described above but in reverse sending the read head back to track (e) which then transmits error signals 50 relative to track (e) which is the correct position.

This entire process repeats itself again during the second half of the rotation of the disk 26. The same set of error signals repeating twice within one 360° rotation produces a twice around error, or a second harmonic.

FIG. 5C is a graph of the frequency spectrum produced by the abovedescribed example. As our example assumes that ellipticity is the only source of harmonic error, the amplitude 56 of the second harmonic is the only significant, but not necessarily the largest, harmonic contribution. This is discerned from the error signal in FIG. 5(B) by looking at the frequency of the oscillations. The oscillations formed when tracks (e) and (f) are being read are depicted as 50 and 54 in the Figure. These oscillations are found at twice the fundamental frequency of the disk 26, or at the second harmonic 56.

The oscillations due to crossing tracks 52 are much higher frequency and for illustration have been placed at the fortieth harmonic 58. Also, for illustrative purposes, an external vibration is shown contributing minimal energy levels to an upper harmonic. This energy level has arbitrarily been placed at the forty-first harmonic 59.

A conventional negative feedback loop, as shown in FIG. 1, would not be able to handle such errors and would only transmit correct data for the short periods when the read head is located over track (e). The addition of the adaptive predictor 10 as shown in FIG. 3 compensates for this type of harmonic distortion and allows the read head 23 to accurately track the correct position.

Figure 6:
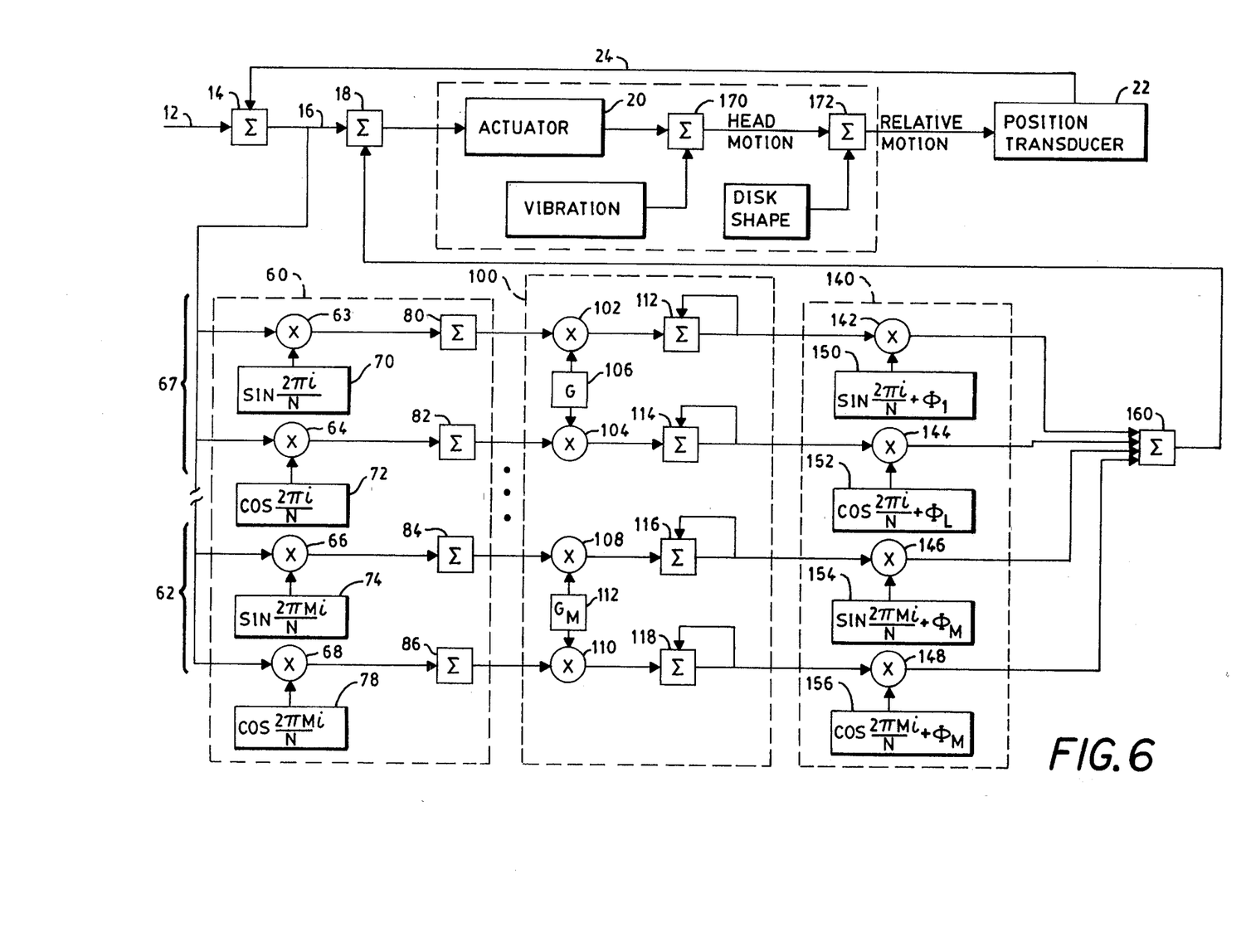
FIG. 6 shows a data flow diagram of a preferred embodiment of the control system utilizing the adaptive predictor of FIG. 2.

FIG. 6 illustrates the preferred embodiment of the adaptive predictor 10 as shown in FIG. 3 but in an expanded, more detailed, form. In this embodiment, a standard Fourier analysis is performed on selected harmonics which are likely to have elevated energy levels in a given application. For example, in an optical disk drive eccentricity and ellipticity are likely where in a drum printer, as previously described, a third harmonic for a three-jaw chuck and a one-half harmonic for oil-whip of bearings would be more likely.

A Fast-Fourier Analysis may be used when a larger number of harmonics are likely. The actual number at which the Fast-Fourier analysis becomes the optimum method depends upon the processing constraints on the system. In the preferred embodiment, experimental analysis determined that standard Fourier analysis could be processed faster than Fast-Fourier analysis for up to five harmonics. In excess of five harmonics Fast-Fourier analysis is the optimum method.

Continuing the example illustrated in FIGS. 5(A) through 5(C), FIG. 6 will further illustrate the workings of the adaptive predictor 10. As the feedback signal depicted in FIG. 5(B) is transmitted through the negative feedback loop 24, the negated signal is continuously added with the command signal 12, as before. The command signal being equal to zero (previously explained), the negated signal is passed through the adder 14 essentially unaltered.

The negated signal is then passed to the adaptive predictor where it is sampled. This is accomplished by multiplying the negated signal by a trigonometric function for each individual harmonic. Since each harmonic is composed of both sine and cosine functions, this is done once for each trigonometric function for each harmonic. In the Figures, the first two lines indicate calculations to determine the first harmonic 61 and the second two lines represent the general case. Referring again to FIG. 6, the negated signal is passed into a multiplier 66 where it is multiplied by a a carrier signal, in this case a sine wave 74 is:

$$\text{SIN}\frac{2\pi iM}{N}$$

where
- i—the current sample number
- M—the harmonic
- N—total number of samples The current sample number, i, is determined by incrementing a counter (not shown) at substantially equal predetermined clock, or angular, intervals over the entire rotation of the disk 26 where the complete rotation is represented by "$2\pi$" radians in the equation. The harmonic, M, is the integer number of the harmonic being determined. In the example, ellipticity has caused a second harmonic so the harmonic number is two, M=2.

The total samples, N, is a predetermined value representing the number of samples required to make an accurate representation of the device being monitored. In our example the total samples is one thousand twenty-four, N=1024. In practice, 1024 samples are far more than is actually required to accurately model the lower harmonics. Using such a large number of samples, though, increases the system's ability to adapt to numerous control systems having various significant harmonics.

The multiplied signal is then passed to a summation block 84 which sums each sample from the first to the $N^{th}$. Once the $N^{th}$ value has been reached, the sum is released. This sum represents the coefficient of the sine function for the second harmonic.

The same analysis is performed on the cosine portion of the second harmonic to produce as an output of the summing block 86 a coefficient for the cosine contribution to the second harmonic.

The carrier signal may be any of numerous well behaved functions such as the sine function illustrated here or a Walsh function, for example. A requirement does exist that the function chosen be repeated in the synthesizer stage.

The coefficients of the respective functions then enter the adapter 100. The coefficient is then multiplied by a gain 112 through multipliers 108 and 110, respectively.

The gain adjusts the coefficients allowing the control system to adjust a time constant for damping of the harmonics. The time constant is adjusted by lowering the gain to less than one such that only a portion of the calculated harmonic contribution is compensated by the control system. In this way it will take more revolutions to completely compensate but in a noisy system where there may be contributions to the lower harmonics due to noise, it may be best to take the slower asymptotic approach to the proper predictive value. In the preferred embodiment, the gain will be unity to strive for the fastest response.

Again, a microprocessor is useful for dynamically controlling the gain of the harmonics. A high gain is often preferred initially to quickly achieve a predictor roughly indicative of the harmonics. Then the gain may be reduced to slow response to changes and to hone the predictor by narrowing the bandwidth and increasing the control systems immunity to noise.

As the gain is increased, the correction, or error compensation, is increased. However, stability is decreased because forced change amplifies inherent noise in the system. If the gain is increased, the circuit is more stable and corrections tend to be more fine and accurate but at the expense of response time which is degraded.

An interactive approach for determining gain at system startup is implemented in the microprocessor 32, where the microprocessor compares the previous harmonic components with the current harmonic components. If the current harmonic components are larger than or comparable to the previous harmonic components but of opposite polarity then the microprocessor 32 reduces the gain by approximately twice the ratio of the previous harmonic components and the current harmonic components and discards the current harmonic components. If the current harmonic components are comparable to the previous harmonic components and have the same sign then the gain is doubled.

The adjusted signals are then transmitted to an adder 116 which adds the adjusted coefficients signal to a running total of all previous adjusted coefficients signals. In this way, the system can adapt to a control system in a variety of applications since the coefficients of the harmonics are determined from sample data and then in each subsequent revolution the harmonics are more accurately compensated so that the coefficients transmitted by the coefficients signal drops off markedly and only small additions and subtractions need be made to the system to fully compensate for each harmonic during all subsequent revolutions.

The adaptive feature is especially useful in severely distorted systems, such as the example herein. The adapter 100 would have limited information to ascertain the harmonic from the small correct sections of FIG. 5(B) which are in the second harmonic. Therefore, the adapter 100 uses the information to get closer causing the correct sections of the error curve to expand thereby producing more information on the harmonic. This is repeated until the entire noise section 52 is essentially non-existent.

The adapted signal is then passed to the synthesizer 140 which reconstructs a compensating sinusoid of the harmonic frequency having an amplitude dictated by the adapted signal. This is accomplished by passing the adapted signal through a multiplier 146 that multiplies it by the harmonic signal phase shifted to compensate for time delays. In practice, the phase shift has minimal consequence upon the resulting signal because of the continuously updating nature of the predictor, therefore, the phase may be assumed to be zero without substantial detriment to the system. Experiments have actually shown that with reasonably quiet signals the adaptive predictor 10 is stable when the phase shift estimate is off by as much as ±45°, so a zero phase shift assumption is reasonable and greatly increases calculation speed.

The resulting signals describing all the components of the harmonics are then added together in an adder 160 and the combined predictive signal is added back to the error signal 16 through adder 18. The predictive signal contains an expected harmonic contribution as determined by previous revolutions and therefore adds the appropriate compensation to the circuit to respond to the harmonics.

It is predictive since the established coefficients signal remains constant through a revolution and as the disk revolves the sampling counter is causing the synthesizer 140 to produce an appropriate compensating harmonic at the appropriate points in the revolution thereby predicting an error to be found at each sampling position.

The harmonic error compensated signal sis transmitted to the actuator circuit 20a which makes position adjustments based on the signal, thus tracking the elliptical tracks 42.

The following two adders 170 and 172 are not physically in the circuit but instead represent environmental and other error contributions to which the system must adapt. For example, vibration or other environmental effect's are added at adder 170 to illustrate the introduction of vibration, electrical noise, or simply a bump against a table upon which the disk is resting. These effects affect head motion.

The adder 172 adds additional effects such as the ellipticity of the disk, a center hole being off center causing eccentricity, or an eight pole motor driving the disk, for example. Each of these cause error signals that affect the relative motion in that the head does not necessarily move but position relative to the center of the track does change.

If a signal is present at the command signal 12 then a seek is being requested where the read head is being moved to another portion of the disk 26. In order that this large change is not considered an error signal, the control system 30 downloads a zero gain to the adaptive predictor for all harmonics. In this way, erroneous samples may be taken but the predictor does not attempt to adapt to them because they are removed by the adapter 100. The predictor then continues to propagate the formerly calculated predictions based upon previous data and the angular rotation of the disk.

The seek may also be refined utilizing the adaptive predictor 10 if a microprocessor 32 is present. Looking again at the disk example, eccentricity is not a function of track and the error due to eccentricity will not change over a radius of the disk. Error due to ellipticity, on the other hand, is a function of track radial location and will become more pronounced as the read head 23 travels radially outward. Therefore, when the seek is started the gain is made to be zero as above for all harmonics. Then, for each harmonic that is a function of track location, the current coefficients are uploaded to the microprocessor 32 and an extrapolation is performed to estimate the harmonic distortion at the new track and a new predictor is downloaded to the adaptive predictor 10 thereby placing the read head closer to the desired location and decreasing seek time. Once the desired track is attained, the gains are reinstated. An increased gain may be used for the second harmonic to speed settling of the downloaded value to the proper position.

In some instances, a desired action may be to ignore the harmonic error contribution. An example of this is the drum printer where slight errors may not be noticeable to the human eye and, therefore, strict error correction causing the actuator to constantly readjust for harmonic error is not desired. In this case, the harmonic error is subtracted, as opposed to added, from the command signal thus negating harmonic contribution and not allowing the actuator to respond to such error. By not responding to the error, the life expectancy of the actuator is increased.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An adaptive predictor for correcting synchronous positioning errors in a servomechanical positioning system of a disk storage device including at least one track having a centerline and a plurality of indicia by which position from the track centerline is measured and is transmitted via a position signal, drive means for rotating the disk medium, transducer means for transferring data to and from the disk medium, actuator means for moving said transducer means over the disk medium to accomplish random access of the data on the disk storage device, said actuator means being responsive to an error signal for maintaining said transducer means over said track centerline, said adaptive predictor comprising analysis means for receiving the position signal and for selectively determining harmonic components within the position signal from position error data encompassing at least one cycle of each harmonic component and for transmitting the determination of harmonic components via a coefficients signal;

adaptive means electrically connected to said analysis means for receiving said coefficients signal and summing the coefficients signal with a cumulative error signal which is a running total of preceding coefficients signals to produce an adaptive error signal that adjusts to changes in the disk medium; and synthesis means for receiving said adaptive error signal and for combining the adaptive error signal with a carrier signal to produce a predictor utilized for compensation of harmonic distortion in the servomechanical positioning system and is predictive of runout due to said harmonic distortion during said random access.

2. An adaptive predictor according to claim 1 wherein said adaptive predictor further comprises variable gain control for selectively controlling adjustments of the coefficients signal according to an operating mode and an environment of the disk storage device.

3. An adaptive predictor according to claim 2 wherein said variable gain control comprises an individual gain control for each harmonic being examined.

4. An adaptive predictor according to claim 1 further comprising sampling means for reading a predetermined amount of data points from the servomechanical positioning system and generating a sample signal upon completion;

drive means for rotating the disk medium and generating an index signal upon completion of each rotation of the disk medium; and threshold means in communication with said sampling means and said drive means for receiving said sample signal and for determining whether the sample signal occurred with an allowable threshold around said index signal.

5. An adaptive predictor according to claim 4 wherein said threshold means is adaptive to adjust the allowable threshold as determined by a time difference between the receipt of the predetermined number of samples and the receipt of the index signal.

6. An adaptive predictor according to claim 5 wherein said threshold means indicates when the allowable threshold has been exceeded to inhibit use of the samples by the adaptive predictor.

7. A method for compensating for harmonic distortion in a control system for a periodic mechanical system, said method comprising receiving an error signal and describing harmonic distortion within the error signal by encoding said harmonic distortion within a coefficients signal;

reading a predetermined number of data points from the periodic mechanical system and, upon completion, generating a sample signal;

determining that a period of the periodic mechanical system is complete and generating an index signal upon completion;

controlling a response to harmonic distortion by selectively adjusting the coefficients signal if the sample signal occurred with an allowable threshold on either side of the index signal by combining the coefficients signal with coefficients signals of previously propagated error signals thus adapting to the control system and producing an adaptive error signal adjustable to said control system; and combining with the adaptive error signal a carrier signal thus producing a predictor signal representative of harmonic distortion in the error signal that may be integrated with the error signal to compensate for the harmonic distortion.

8. A method according to claim 7 further comprising a step of producing a series of coefficients of non-trigonometric functions which describe the harmonic distortion.

9. An adaptive predictor for use in a control system, forming part of a mechanical system that operates on a periodic basis, for compensating for harmonic distortion due to harmonics related to the periodic basis within an error signal, said adaptive predictor comprising analysis means for analyzing said error signal from position error data encompassing at least one cycle of each of the harmonics and for providing a coefficients signal representative of said harmonic distortion;

adaptive means in electrical communication with said analysis means for combining the coefficients signal with a coefficients signal of a previous period of operation of the mechanical system thereby producing an adaptive error signal which is adaptable to variations in the operation of the mechanical system, said adaptive means also having variable gain control for adaptively controlling adjustments of the coefficients signal such that a time constant for damping of the harmonics is adjusted as determined by an amount of time since initialization of the adaptive means; and synthesis means for receiving said adaptive error signal and for combining the adaptive error signal with a carrier signal related to the periodic basis to produce a predictor utilized for compensation of harmonic distortion in the control system.

10. An adaptive predictor according to claim 9 wherein said variable gain control further comprises individual gain control for each of the harmonics being examined thus allowing removal of compensation for individual harmonics from the adaptive predictor according to an operating mode and an environment of the mechanical system.

11. An adaptive predictor according to claim 9 wherein said adaptive means compares the adaptive error signal to a previous adaptive error signal and alters the adjustments to the coefficients signal such that a new gain is produced.

12. An adaptive predictor according to claim 11 wherein if the adaptive error signal is larger than or comparable to the previous adaptive error signal but of opposite polarity then the gain is reduced by approximately twice a ratio of the adaptive error signal to the previous adaptive error signal and the adaptive error signal is discarded; if the adaptive error signal is comparable to the previous adaptive error signal and has a same polarity then the gain is doubled.

13. An adaptive predictor according to claim 9 further comprising sampling means for reading a series of sample points from the error signal at a fixed interval and for transmitting a sample signal representing a number of samples read;

drive means for generating periodic motion within the periodic mechanical system and for transmitting an index signal upon determination that a period of the periodic motion is complete; and threshold means, in communication with said sampling means and said drive means, for receiving the sample signal and for determining whether a predetermined number of sample points was read within an allowable threshold around said index signal.

14. An adaptive predictor according to claim 13 wherein said threshold means is adaptive to adjust the allowable threshold as determined by a difference between the sample signal and the index signal.

15. An adaptive predictor according to claim 9 wherein said analysis means utilizes a non-sinusoidal analysis to produce said coefficients signal which for each of the harmonics contains the magnitude of at least one non-sinusoidal function to describe the harmonic distortion.

16. An adaptive predictor according to claim 9 wherein said analysis means analyzes said error signal for integral multiples of a first harmonic in the harmonic distortion as well as sub-harmonics which are fractional multiples of the first harmonic to eliminate error due to the sub-harmonics.

17. An adaptive predictor for use in a control system, forming part of a mechanical system that operates on a periodic basis, for compensating for harmonic distortion due to harmonics related to the periodic basis within an error signal, said adaptive predictor comprising analysis means for analyzing said error signal and for providing a coefficients signal representative of said harmonic distortion;

adaptive means in electrical communication with said analysis means for combining the coefficients signal with a coefficients signal of a previous period of operation of the mechanical system thereby producing an adaptive error signal which is adaptable to variations in the operation of the mechanical system, said adaptive means also having variable gain control for adaptively controlling adjustments of the coefficients signal such that a time constant for damping of the harmonics is adjusted as determined by an amount of time since initialization of the adaptive means;

said adaptive means compares the adaptive error signal to a previous adaptive error signal and alters the adjustments to the coefficients signal such that a new gain is produced and if the adaptive error signal is larger than or comparable to the previous adaptive error signal but of opposite polarity then the gain is reduced by a first predetermined multiple of a ratio of the adaptive error signal to the previous adaptive error signal and the adaptive error signal is discarded; if the adaptive error signal is comparable to the previous adaptive error signal and has a same polarity then the gain is multiplied by a second predetermined multiple; and synthesis means for receiving said adaptive error signal and for combining the adaptive error signal with a carrier signal related to the periodic basis to produce a predictor utilized for compensation of harmonic distortion in the control system.

* * * * *